(12) United States Patent
Kato

(10) Patent No.: US 9,393,640 B2
(45) Date of Patent: Jul. 19, 2016

(54) WELDED MATERIAL MANUFACTURING METHOD AND WELDING JIG

(71) Applicant: MITSUBISHI HEAVY INDUSTRIES, LTD., Tokyo (JP)

(72) Inventor: Yoshinori Kato, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 14/438,769

(22) PCT Filed: Dec. 19, 2012

(86) PCT No.: PCT/JP2012/082900
§ 371 (c)(1),
(2) Date: Apr. 27, 2015

(87) PCT Pub. No.: WO2014/097419
PCT Pub. Date: Jun. 26, 2014

(65) Prior Publication Data
US 2015/0273623 A1 Oct. 1, 2015

(51) Int. Cl.
*B23K 20/12* (2006.01)
(52) U.S. Cl.
CPC ............ *B23K 20/126* (2013.01); *B23K 20/125* (2013.01); *B23K 20/1245* (2013.01); *B23K 2201/28* (2013.01)
(58) Field of Classification Search
None
See application file for complete search history.

(56) References Cited

U.S. PATENT DOCUMENTS

| 4,527,033 | A | * | 7/1985 | Matsuyama | ............. | C21D 9/50 |
| | | | | | | 219/60 R |
| 4,729,502 | A | * | 3/1988 | Fukukawa | ................ | B23B 5/16 |
| | | | | | | 228/13 |
| 4,764,657 | A | * | 8/1988 | Fukukawa | .............. | B21C 37/08 |
| | | | | | | 219/124.1 |
| 5,550,347 | A | * | 8/1996 | Kasuya | ................ | B23K 9/0953 |
| | | | | | | 219/137 R |
| 5,794,835 | A | * | 8/1998 | Colligan | ................... | B23C 5/22 |
| | | | | | | 228/13 |
| 5,992,726 | A | * | 11/1999 | Shaffer | ............. | B23K 37/0435 |
| | | | | | | 228/213 |

(Continued)

FOREIGN PATENT DOCUMENTS

| CN | 102470479 A | 5/2012 |
| CN | 102672341 A | 9/2012 |

(Continued)

OTHER PUBLICATIONS

PCT/ISA/210, "International Search Report for PCT/JP2012/082900," Apr. 2, 2013.

(Continued)

*Primary Examiner* — Kiley Stoner
(74) *Attorney, Agent, or Firm* — Manabu Kanesaka; Benjamin Hauptman; Kenneth Berner

(57) ABSTRACT

The welded material manufacturing method includes preparing a welding jig, disposed to straddle a line extended from the abutment line of the abutting parts of two plates and supporting an end tab, and in which a groove and an open section are formed; disposing the plates to abut against each other; disposing the welding jig on an end of the abutment line; setting an end tab on the welding jig and positioning the end tab with respect to the plates; disposing the first shoulder and a probe connected to the first shoulder on the groove side of the extension line; disposing a second shoulder in a position corresponding to the first shoulder and the probe; connecting the second shoulder to the probe to interpose the end tab between the first shoulder and the second shoulder; and executing the friction stir welding.

5 Claims, 7 Drawing Sheets

(56) References Cited

U.S. PATENT DOCUMENTS

| | | | |
|---|---|---|---|
| 6,199,745 B1 | 3/2001 | Campbell et al. | |
| 7,556,187 B2 * | 7/2009 | Sunahara | B23K 20/124 228/112.1 |
| 7,815,094 B2 * | 10/2010 | Sunahara | B23K 20/124 228/112.1 |
| 2003/0098336 A1 * | 5/2003 | Yamashita | B23K 20/124 228/112.1 |
| 2004/0084506 A1 * | 5/2004 | Tanaka | B23K 20/124 228/112.1 |
| 2006/0163327 A1 * | 7/2006 | Sunahara | B23K 20/124 228/112.1 |
| 2010/0096438 A1 * | 4/2010 | Sato | B23K 20/1225 228/114 |
| 2012/0181324 A1 * | 7/2012 | Yamauchi | B23K 20/124 228/114 |
| 2012/0227890 A1 * | 9/2012 | Yamauchi | B23K 20/124 156/73.5 |
| 2013/0221069 A1 * | 8/2013 | Saito | B23K 20/125 228/2.1 |
| 2014/0004375 A1 * | 1/2014 | Yamauchi | B23K 20/1225 428/615 |
| 2014/0151438 A1 * | 6/2014 | Fleck | B23K 20/1225 228/104 |
| 2015/0273637 A1 * | 10/2015 | Hori | B23K 20/1255 29/890.03 |

FOREIGN PATENT DOCUMENTS

| | | | | |
|---|---|---|---|---|
| JP | 58025892 A | * | 2/1983 | |
| JP | 60068197 A | * | 4/1985 | |
| JP | EP 0239963 A1 | * | 10/1987 | B21C 37/08 |
| JP | 2000-033484 A | | 2/2000 | |
| JP | 2002-263863 A | | 9/2002 | |
| JP | 2004-243375 A | | 9/2004 | |
| JP | 2005-103574 A | | 4/2005 | |
| JP | 2005-152909 A | | 6/2005 | |
| JP | 2006-088173 A | | 4/2006 | |
| JP | 2007-061877 A | | 3/2007 | |
| JP | 2008194732 A | * | 8/2008 | |
| JP | 2008-302421 A | | 12/2008 | |
| JP | 2009-208101 A | | 9/2009 | |
| JP | 2011218363 A | * | 11/2011 | |
| JP | 2012-096291 A | | 5/2012 | |
| JP | 2012-183565 A | | 9/2012 | |
| JP | 2012-232342 A | | 11/2012 | |
| JP | 2013-082010 A | | 5/2013 | |
| WO | 2012/111181 A1 | | 8/2012 | |

OTHER PUBLICATIONS

PCT/ISA/237, "Written Opinion of the International Searching Authority for PCT/JP2012/082900," Apr. 2, 2013.
Japan Patent Office, "Notice of Allowance for JP 2014-552810," Nov. 24, 2015.
Chinese Patent Office, Office Action for Chinese Patent Application No. 201280076414.1 May 3, 2016.

* cited by examiner

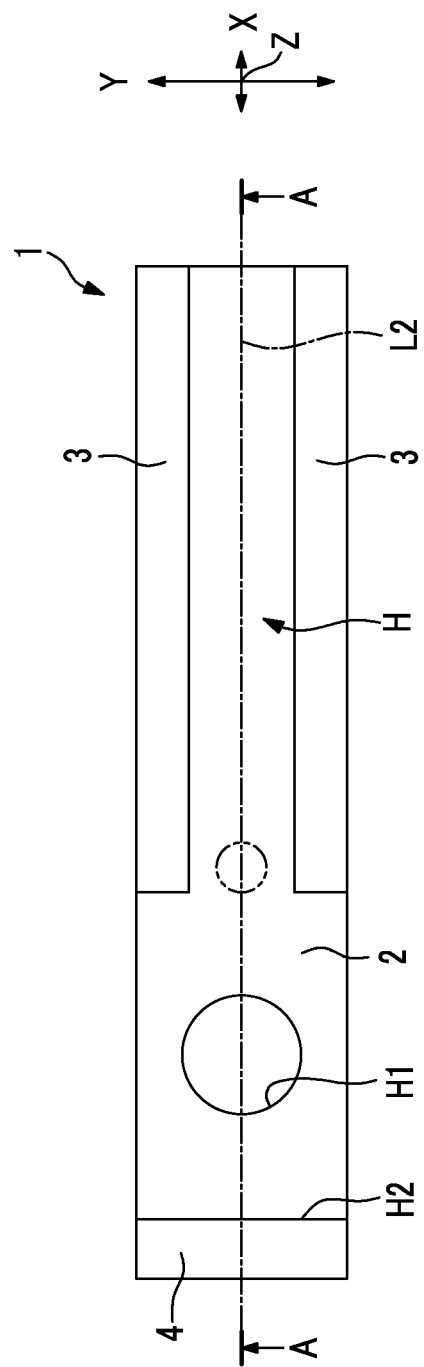

WELDED MATERIAL MANUFACTURING METHOD AND WELDING JIG

RELATED APPLICATIONS

The present application is National Phase of International Application No. PCT/JP2012/082900 filed Dec. 19, 2012 the disclosure of which is hereby incorporated by reference herein in its entirety.

TECHNICAL FIELD

The present invention relates to a welded material manufacturing method which welds members with the members abutting each other, and a welding jig which is used in the method.

BACKGROUND ART

As one of methods of welding a workpiece composed of two members, friction stir welding is known. Friction stir welding is a welding method of welding a workpiece by frictional heat generated on the surface of the workpiece by rotating a tool in a state of pressing an abutting portion of the workpiece on a shoulder surface of the tool.

Incidentally, in such friction stir welding, a tool called a bobbin tool is sometimes used. In the bobbin tool type tool, a front surface-side shoulder having one shoulder surface is disposed on the front surface side of a workpiece, a back surface-side shoulder having one shoulder surface facing the other shoulder surface is disposed on the back surface side of the workpiece, and these two shoulders are connected by a probe penetrating the workpiece. In this way, the friction stir welding of the workpiece is performed by generating frictional heat by interposing and pressing the front surface and the back surface of the workpiece between the shoulder surfaces of the two shoulders, and stirring the workpiece by the probe.

In such friction stir welding, in order to prevent the occurrence of a welding defect at a welding starting position and a welding ending position, a technique is used in which an end tab is disposed at an end portion of an abutting portion of the workpiece and the welding starting position and the welding ending position are set on the end tab.

Here, PTL 1 discloses a technique in which such an end tab is provided and friction stir welding is performed by a bobbin tool. Further, PTL 2 discloses a jig which holds an end tab (a tab plate).

CITATION LIST

Patent Literature

[PTL 1] Japanese Unexamined Patent Application Publication No. 2004-243375

[PTL 2] Japanese Unexamined Patent Application Publication No. 2008-302421

SUMMARY OF INVENTION

Technical Problem

However, in PTL 1, although there is a description of fixing the end tab by using a jig, a specific fixing method is not clearly stated therein. In addition, the jig of PTL 2 is not intended to be applied to friction stir welding using a bobbin tool.

The present invention provides a welded material manufacturing method of manufacturing a welded material by easily and reliably fixing an end tab and performing friction stir welding by using a bobbin tool, and a welding jig which is used in welding.

Solution to Problem

According to a first aspect of the present invention, there is provided a welded material manufacturing method of performing friction stir welding with abutting portions of plate materials interposed between a first shoulder and a second shoulder, the method including: a process of preparing a welding jig which is disposed so as to straddle a line extended from an abutment line of the abutting portions and supports an end tab from a position intersecting with the extended line and in which a groove portion which is disposed along the extended line and through which the first shoulder can pass and an open portion facing the groove portion are formed; a process of disposing the plate materials so as to abut each other; a process of disposing the welding jig at an end portion of the abutment line; a process of installing the end tab on the jig and aligning the end tab with respect to the plate materials; a process of disposing the first shoulder and a probe connected to the first shoulder at a position that is on the groove portion side with respect to the extended line; a process of disposing the second shoulder at a position corresponding to the first shoulder and the probe; a process of connecting the second shoulder and the probe so as to interpose the end tab between the first shoulder and the second shoulder; and a process of executing the friction stir welding.

According to such a welded material manufacturing method, it is possible to support the end tab on the line extended from the abutment line of the plate materials by the welding jig. For this reason, friction stir welding using the end tab becomes possible without performing the welding and mounting or the like of the end tab on the plate material.

In addition, in the welding jig, the groove portion is formed along the line extended from the abutment line such that the first shoulder and the probe can pass therethrough. For this reason, even when performing the friction stir welding along the abutment line and the extended line in a state where the first shoulder and the second shoulder are connected by the probe, that is, when performing welding by using a bobbin tool, it becomes possible for the first shoulder to pass through the groove portion with the progress of welding. Accordingly, it is possible to reliably execute the friction stir welding of the plate materials even by the bobbin tool.

Further, since the open portion facing the groove portion is formed in the welding jig, when connecting the probe to the second shoulder, it is possible to visually confirm a connection situation of whether the connection has been reliably made.

Further, in a welded material manufacturing method according to a second aspect of the present invention, as the welding jig in the first aspect described above, a welding jig in which the open portion has a first open portion penetrating coaxially with the first shoulder and the probe in a direction in which the first shoulder and the second shoulder come close to each other and are separated from each other may be used.

In this manner, the open portion has the first open portion penetrating in the direction in which the first shoulder and the second shoulder come close to each other and are separated from each other, that is, in a direction orthogonal to a welding direction, whereby it is possible to insert a tool through the first open portion and connect the probe and the second shoulder, and therefore, it is possible to easily perform connection work.

Further, in a welded material manufacturing method according to a third aspect of the present invention, as the welding jig in the second aspect described above, a welding jig in which the first open portion has an outer diameter greater than an outer diameter of the first shoulder may be used.

Due to such a first open portion, it is possible to connect the first shoulder and the probe to the second shoulder through the first open portion, and therefore, it is not necessary to separately provide an opening for assembling the first shoulder and the second shoulder. Accordingly, friction stir welding using the end tab and the bobbin tool becomes possible with the manufacturing cost of the jig reduced.

Further, in a welded material manufacturing method according to a fourth aspect of the present invention, as the welding jig in the first to third aspects described above, a welding jig in which the open portion has a second open portion penetrating in a direction orthogonal to a direction in which the first shoulder and the second shoulder come close to each other and are separated from each other and facing a connection portion between the first shoulder and the probe may be used.

In this manner, the open portion has the second open portion, whereby it is possible to easily visually observe the connection portion between the first shoulder and the probe, and therefore, it is possible to execute the friction stir welding in a state where the first shoulder and the second shoulder are reliably assembled to each other. Accordingly, since reliable welding becomes possible, it leads to improvement in the quality of the welded material.

Further, in a welded material manufacturing method according to a fifth aspect of the present invention, as the welding jig in the fourth aspect described above, a welding jig in which an opening dimension of the second open portion in a direction in which the first shoulder and the second shoulder come close to each other and are separated from each other has a size in which the first shoulder is accommodated in the second open portion in a state where the second shoulder is connected to the probe may be used.

Due to such a second open portion, when connecting the probe to the second shoulder, thereby assembling the first shoulder and the second shoulder, the entire first shoulder can be visually observed, and therefore, it is possible to execute the friction stir welding in a state where the first shoulder and the second shoulder are more reliably assembled to each other. In addition, at the time of assembling, it also becomes possible to access the first shoulder from a direction orthogonal to the direction in which the first shoulder and the second shoulder come close to each other and are separated from each other, that is, from a radial direction of the first shoulder, and thus it is possible to connect the probe and the second shoulder by inserting a tool into the second open portion, and therefore, it is possible to more easily perform work of assembling the first shoulder and the second shoulder.

Further, according to a sixth aspect of the present invention, there is provided a welding jig which is used when friction stir welding is performed with abutting portions of plate materials interposed between a first shoulder and a second shoulder, wherein the welding jig is disposed so as to straddle a line extended from an abutment line of the abutting portions and supports an end tab from a position intersecting with the extended line, and a groove portion which is disposed along the extended line and an open portion facing the groove portion are formed in the welding jig.

Due to such a welding jig, friction stir welding using the end tab becomes possible without performing the welding and mounting or the like of the end tab on the plate material. In addition, when connecting the first shoulder and the second shoulder by the probe and performing the friction stir welding, it becomes possible for the first shoulder to pass through the groove portion with the progress of welding, and therefore, it is possible to reliably execute the friction stir welding of the plate materials by the bobbin tool. Further, when connecting the probe to the second shoulder, it is possible to perform work while visually observing a connection situation through the open portion.

Advantageous Effects of Invention

According to the welded material manufacturing method and the welding jig related to the present invention, it becomes possible to manufacture a welded material by easily and reliably fixing the end tab and performing friction stir welding by using the bobbin tool.

BRIEF DESCRIPTION OF DRAWINGS

FIG. 4A is a top view showing a welding jig which is used in the welded material manufacturing method according to the embodiment of the present invention.

DESCRIPTION OF EMBODIMENTS

Hereinafter, a method of manufacturing a welded material W and a welding jig 1 according to an embodiment of the present invention will be described.

First, an example of a friction stir welding device 100 which is used in the method of manufacturing the welded material W, and the welded material W which is manufactured by friction stir welding will be described.

Figure 1:
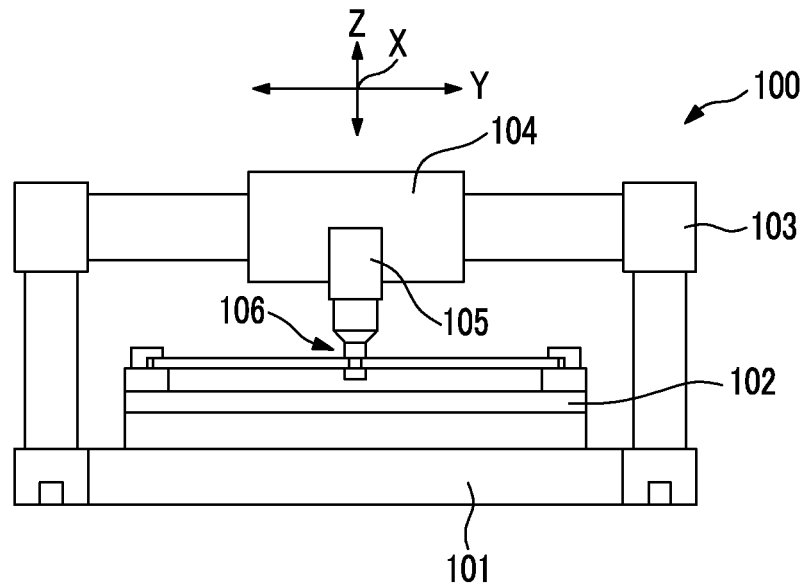
FIG. 1 is a front view showing a friction stir welding device which is used in a welded material manufacturing method according to an embodiment of the present invention.

As shown in FIG. 1, the friction stir welding device 100 is provided with a bed 101 serving as a foundation, a surface plate 102 placed on the bed 101, a device main body 103 which has the form of a gate provided at the bed 101 so as to surround the surface plate 102, and a working head 104 provided in the device main body 103.

The bed 101 has a plate shape and receives a reactive force at the time of the friction stir welding.

In the surface plate 102, the upper surface becomes a reference plane (an X-Y plane) in a Z-axis direction which is orthogonal to the bed 101, and plate materials W1 which are members to be welded are fixed to the upper surface in a state of abutting each other.

The device main body 103 is formed in a gate shape by being erected upward on both sides in a right-left direction (a Y-axis direction) of the surface plate 102 in the bed 101 and then extending in the Y-axis direction above the surface plate 102. Further, the device main body 103 is made so as to be able to move in an X-axis direction orthogonal to the Y-axis direction in a plane parallel to the surface plate 102.

The working head 104 is mounted on the device main body 103 above the surface plate 102, then extends downward in the Z-axis direction, and is provided so as to be able to relatively move in the Y-axis direction with respect to the device main body 103. Further, the working head 104 has a rotation mechanism 105 and is made so as to be able to rotate about a Z-axis.

Then, a rotating tool 106 is fixed to a lower end portion of the working head 104.

Figure 2:
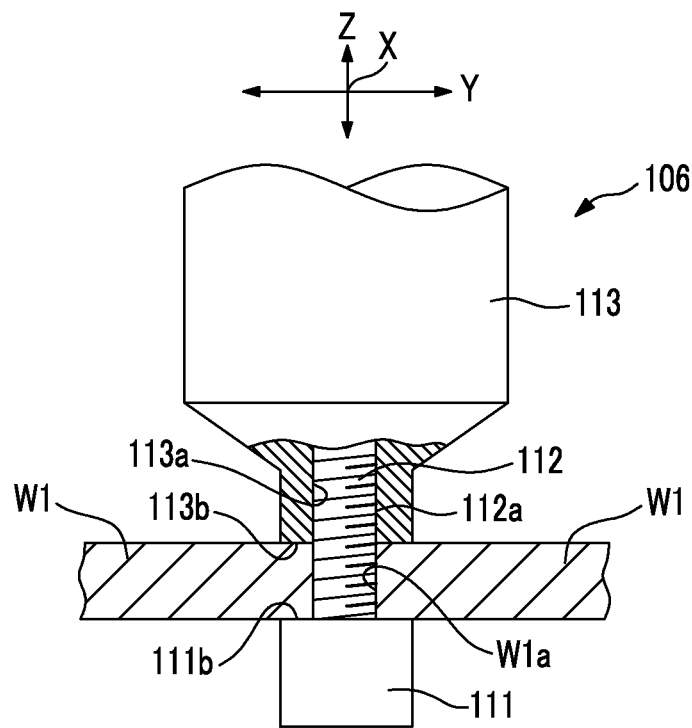
FIG. 2 is related to the friction stir welding device which is used in the welded material manufacturing method according to the embodiment of the present invention and is a front view showing a rotating tool in an enlarged manner.

As shown in FIG. 2, the rotating tool 106 has, with respect to abutting portions W1a of the two plate materials W1 abutting each other in the Y-axis direction, a lower shoulder 111 (a first shoulder) which is disposed below in the Z-axis direction, an upper shoulder 113 (a second shoulder) which is disposed above, and a probe 112 which connects the lower shoulder 111 and the upper shoulder 113.

The lower shoulder 111 has a cylindrical shape centered on an axis line parallel to the Z-axis direction, and an upper surface 111b comes into contact with the plate materials W1 at the time of the friction stir welding.

The probe 112 is a rod-shaped member which is connected to the lower shoulder 111 coaxially with the lower shoulder 111, then extending upward in the Z-axis direction from the upper surface 111b, and has a diameter smaller than the outer diameter of the lower shoulder 111. Further, a male threaded portion 112a is formed in the outer peripheral surface of the probe 112 and disposed to penetrate the abutting portion W1a in the Z-axis direction.

The upper shoulder 113 is mounted on the rotation mechanism 105 of the working head 104 and has a substantially cylindrical shape provided coaxially with the lower shoulder 111 and the probe 112, and a lower surface 113b comes into contact with the plate materials W1 at the time of the friction stir welding, and a female threaded portion 113a to which the male threaded portion 112a of the probe 112 is screwed is formed so as to be recessed in the Z-axis direction from the lower surface 113b.

That is, the rotating tool 106 becomes a bobbin tool in which the upper shoulder 113, the probe 112, and the lower shoulder 111 integrally rotate with the two plate materials W1, which are members to be welded, interposed therebetween in the Z-axis direction, thereby performing the friction stir welding. Accordingly, the Z-axis direction becomes a direction in which the upper shoulder 113 and the lower shoulder 111 come close to each other and are separated from each other.

Here, the rotation mechanism 105 or the surface plate 102 is made so as to be able to move up and down in the Z-axis direction, and thus a relative position in the Z-axis direction between the plate materials W1 fixed to the surface plate 102 and the rotating tool 106 can be adjusted.

In addition, the friction stir welding device 100 in this embodiment is an example, and position adjustment in the X-axis direction and the Y-axis direction may be performed, for example, by fixing the rotating tool 106 so as to be unable to move in the X-Y plane and moving the surface plate 102 in the X-Y plane.

Figure 3:
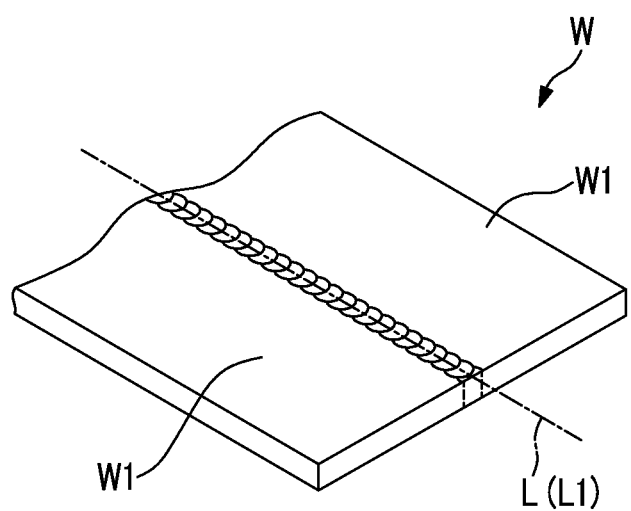
FIG. 3 is a perspective view showing a welded material which is manufactured by the welded material manufacturing method according to the embodiment of the present invention.

As shown in FIG. 3, the welded material W is manufactured by causing the two plate materials W1 to abut each other in the Y-axis direction and rotating the rotating tool 106 of the friction stir welding device 100, thereby causing the periphery to perform plastic flow by frictional heat, and thus integrating the two plate materials W1.

Next, the welding jig 1 which is used when welding is actually performed by the method of manufacturing the welded material W in this embodiment will be described.

Hereinafter, a case will be described where the plate material W1 which is a member to be welded is assumed to be a double-skin panel made of aluminum alloy, which is used in a vehicle of a track transportation system, a body structure of a railroad vehicle or the like, and an upper plate of the double-skin panel is welded. However, a simple plate material W1 as shown in FIGS. 1 to 3 can also be welded by the same technique.

As shown in FIGS. 4A, 4B, 6, and 7, the welding jig 1 has a rectangular parallelepiped shape extending in the X-axis direction in a state of performing the friction stir welding.

Specifically, the welding jig 1 has a bottom plate 2 which is disposed in the X-Y plane at a lower portion in the Z-axis direction, a pair of side plates 3 which are provided at both end portions in the Y-axis direction of the bottom plate 2 and erected upward in the Z-axis direction, and an end portion side plate 4 which is provided at an end portion on one side in the X-axis direction of the bottom plate 2 and erected upward in the Z-axis direction, and has a symmetrical shape in the Y-axis direction with a center line L2 parallel to an extended line L1 as the boundary.

The bottom plate 2 is supported by a screw jack 116 fixed to the surface plate 102 on the lower side in the Z-axis direction, and is made so as to be able to move up and down in the Z-axis direction. In addition, the screw jack 116 may be provided integrally with the bottom plate 2, that is, the welding jig 1 itself may have an elevating function.

In addition, in the bottom plate 2, a first open portion H1 which is a through-hole penetrating in the Z-axis direction is formed at a position between the end portion side plate 4 and the side plate 3, on one side (a side separated from the plate material W1) in the X-axis direction. The hole diameter of the first open portion H1 is formed to be greater than the outer diameter of the lower shoulder 111, and the axial center of the first open portion H1 intersects perpendicularly to the center line L2.

Further, the two side plates 3 form a space between them and the bottom plate 2, and the space becomes a groove portion H extending in the X-axis direction. The dimension in the Y-axis direction of the groove portion H is greater than the outer diameter of the lower shoulder 111 as shown in FIG. 4A, and thus the lower shoulder 111 is movable in the X-axis direction.

The upper surface of the end portion side plate 4 is disposed on the same plane as the upper surfaces of the side plates 3 (on a plane parallel to the X-Y plane), and an end tab W2 is provided to be placed on the end portion side plate 4 and the side plates 3. Then, a space surrounded by the end tab W2, the end portion side plate 4, the two side plates 3, and the bottom plate 2 becomes a second open portion H2.

Figure 4B:
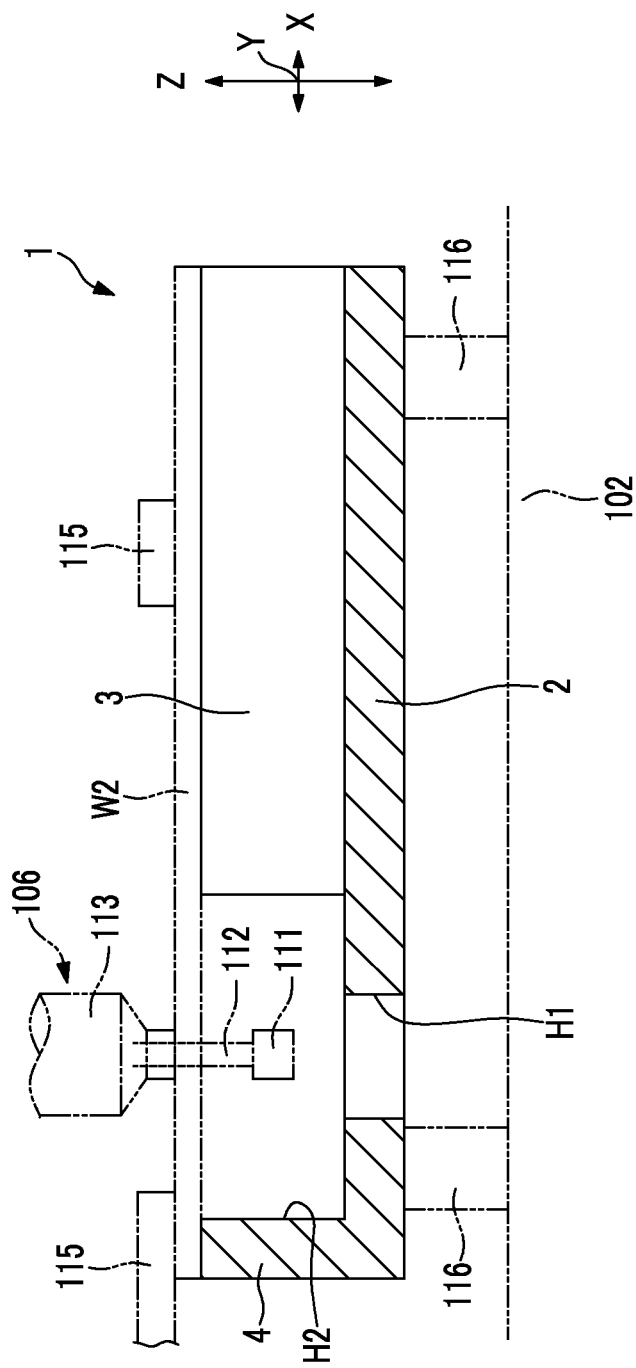
FIG. 4B is a side view showing the welding jig which is used in the welded material manufacturing method according to the embodiment of the present invention and shows a cross section along a line A-A of FIG. 4A.

Further, the dimensions in the Z-axis direction of the end portion side plate 4 and the side plates 3 are determined such that the entire lower shoulder 111 is accommodated in the second open portion H2 in a state where the lower shoulder 111 is assembled to the upper shoulder 113 through the probe 112, as shown in FIG. 4B.

Here, before the start of the friction stir welding, the lower shoulder 111 is assembled to the upper shoulder 113 in a state where the probe 112 extends downward in the Z-axis direction, and after the start of the friction stir welding, the probe 112 is drawn up by oil pressure, and thus the upper surface 111b of the lower shoulder 111 comes into contact with the end tab W2. Therefore, the dimension in the Z-axis direction of the second open portion H2 is determined in consideration of a stroke amount of the probe 112.

In this way, the first open portion H1, the second open portion H2, and the groove portion H communicate with each other, that is, the first open portion H1 and the second open portion H2 become an open portion facing the groove portion H.

Figure 5:
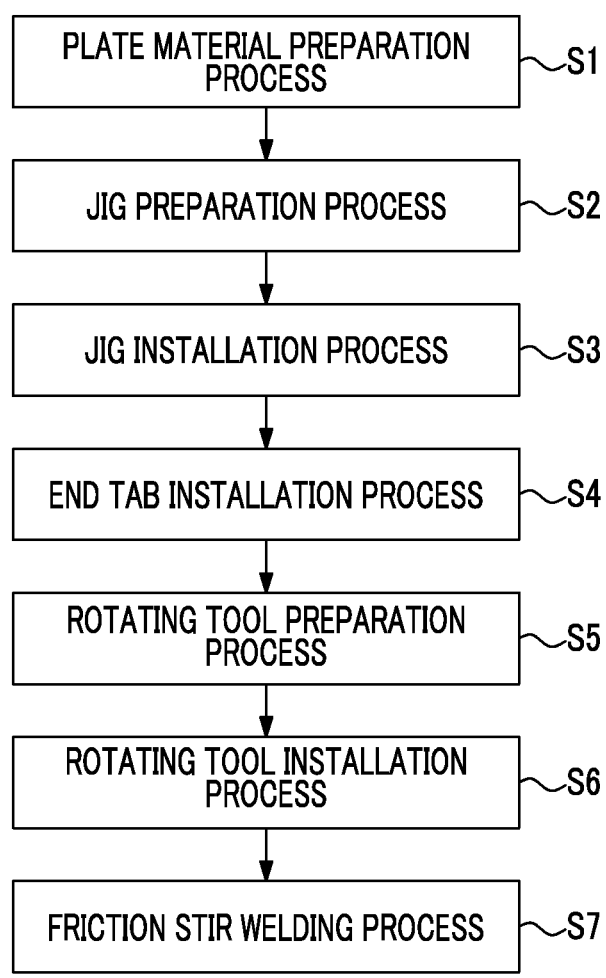
FIG. 5 is a flow diagram showing the procedure of the welded material manufacturing method according to the embodiment of the present invention.
Figure 6:
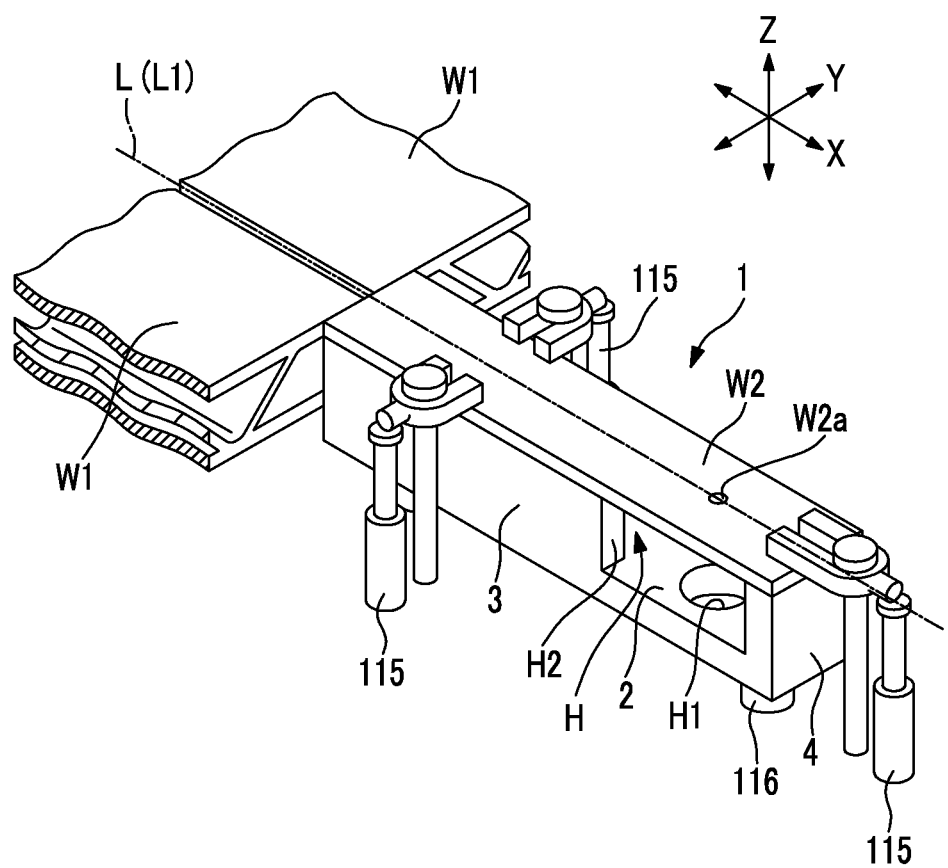
FIG. 6 is a perspective view showing a state before welding in which the welding jig which is used in the welded material manufacturing method according to the embodiment of the present invention is set.
Figure 7:
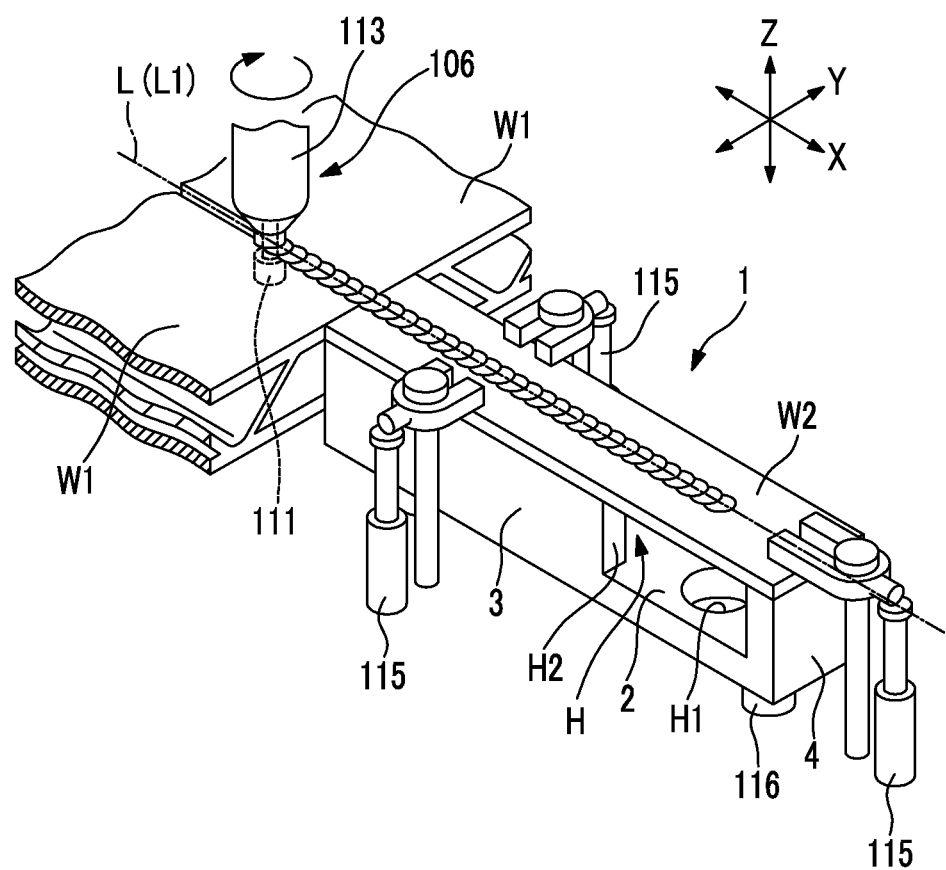
FIG. 7 is a perspective view showing a state during welding in which the welding jig which is used in the welded material manufacturing method according to the embodiment of the present invention is set.

Next, a process of manufacturing the welded material W by using the welding jig 1 will be described in detail with reference to FIGS. 5 to 7.

First, a plate material preparation process S1 is executed. That is, the plate materials W1 are abutted with each other and fixed to the surface plate 102 of the friction stir welding device 100.

Next, a jig preparation process S2 is executed. That is, the welding jig 1 manufactured separately is prepared.

Next, a jig installation process S3 is executed. That is, the welding jig 1 is disposed on the extended line L1 of an abutment line L of the abutting portion W1a of the upper plate in the two plate materials W1 which are members to be welded, so as to straddle the extended line L1 in the Y-axis direction, and provided in contact with or closely to the plate materials W1 from the X-axis direction at an end portion of the abutment line L.

Next, an end tab installation process S4 is executed. That is, as shown in FIG. 6, installation and alignment of the end tab W2 are performed. The end tab W2 is installed at an upper portion in the Z-axis direction of the welding jig 1, that is, the end tab W2 is placed on the upper surfaces of the side plates 3 and the end portion side plate 4, and height adjustment is performed by the screw jack 116 supporting the welding jig 1, such that the end tab W2 becomes flush with the plate materials W1. The end tab W2 is a plate material having the same thickness dimension as the plate material W1.

Further, along with the height adjustment, the end tab W2 is fixed to be pressed against the welding jig 1 from above in the Z-axis direction so as not to interfere with the upper shoulder 113, by clamps 115 fixed to the surface plate 102 on both sides in the Y-axis direction and one side in the X-axis direction. Further, the end tab W2 is fixed to be pressed against the two plate materials W1 from the X-axis direction. In this way, the welding jig 1 supports the end tab W2 from below in the Z-axis direction intersecting the extended line L1.

Further, a pilot hole W2a penetrating in the Z-axis direction is formed at a midway position in the X-axis direction in the end tab W2. The pilot hole W2a serves as a starting point of the friction stir welding, and a hole diameter has substantially the same dimension as the outer diameter of the probe 112.

Next, a rotating tool preparation process S5 is executed. That is, the lower shoulder 111 and the probe 112 are disposed in the second open portion H2 through the first open portion H1 and the probe 112 is inserted into the pilot hole W2a of the end tab W2. Further, the upper shoulder 113 is mounted on the rotation mechanism 105 of the friction stir welding device 100 and position adjustment is performed so as to be at a position corresponding to the probe 112, that is, to be coaxial with the probe 112.

Next, a rotating tool installation process S6 is executed. That is, the probe 112 and the upper shoulder 113 are connected by screwing the male threaded portion 112a of the probe 112 into the female threaded portion 113a of the upper shoulder 113, and the lower surface 113b of the upper shoulder 113 is brought into contact with the end tab W2. Then, the probe 112 is pulled upward in the Z-axis direction with oil pressure by the friction stir welding device 100, thereby bringing the upper surface of the lower shoulder 111 into contact with the end tab W2, whereby the end tab W2 is interposed between the upper shoulder 113 and the lower shoulder 111 (refer to FIG. 2).

Finally, a friction stir welding process S7 is executed. That is, the two plate materials W1 are welded by advancing the rotating tool 106 in the X-axis direction while rotating the rotating tool 106 in a state where the end tab W2 is inserted therein, as shown in FIG. 7, whereby the welded material W is manufactured.

In such a method of manufacturing the welded material W, it is possible to support the end tab W2 on the extended line L1 of the abutment line L of the plate materials W1 by the welding jig 1, and the end tab W2 can be installed to be pressed against the plate materials W1 in the X-axis direction. For this reason, the welding and mounting or the like of the end tab W2 to the plate material W1 is not required, and therefore, work associated with the mounting of the end tab W2 can be simplified.

In addition, in the welding jig 1, the groove portion H is formed along the extended line L1 of the abutment line L such that the lower shoulder 111 and the probe 112 can pass therethrough, and therefore, even when performing the friction stir welding by connecting the lower shoulder 111 and the upper shoulder 113 by the probe 112, that is, when performing welding by using a bobbin tool, it becomes possible for the lower shoulder 111 to pass through the groove portion H with the progress of welding. Accordingly, it is possible to reliably execute the friction stir welding of the plate materials W1 by the bobbin tool.

Further, in the welding jig 1, the first open portion H1 and the second open portion H2 facing the groove portion H are formed, and therefore, when connecting the probe 112 to the upper shoulder 113, it is possible to perform work while visually observing a connection situation.

In addition, since it is possible to insert a tool through the first open portion H1 and connect the probe 112 and the upper shoulder 113, it is possible to easily perform the connection work, and since the first open portion H1 has an outer diameter greater than the outer diameter of the lower shoulder 111, it is possible to connect the probe 112 and the upper shoulder 113 through the first open portion H1. Accordingly, it is not necessary to separately provide an opening for assembling the lower shoulder 111 and the upper shoulder 113, and thus the friction stir welding using the end tab W2 and the bobbin tool becomes possible with the manufacturing cost of the welding jig 1 reduced.

Further, since a connection portion between the lower shoulder 111 and the probe 112 can be visually observed through the second open portion H2, the friction stir welding can be executed in a state where the lower shoulder 111 and the upper shoulder 113 are reliably assembled to each other, thereby leading to improvement in the quality of the welded material W.

In particular, in this embodiment, the friction stir welding is performed with the upper surface 111b of the lower shoulder 111 brought into contact with the end tab W2 by raising the probe 112 upward by oil pressure. However, contact pressure at this time is not very large, and thus it is difficult to measure the contact pressure by other techniques. In this regard, in this embodiment, since the connection portion can be visually observed through the second open portion H2, the confirmation of a contact state is possible. In addition, the connection portion can be visually observed, whereby the friction stir welding can be prevented from being started while the lower shoulder 111 does not come into contact with the end tab W2 due to a hydraulic device which raises the probe 112 upward not functioning due to some cause, thereby leading to improvement in welding quality.

In addition, since the dimension in the Z-axis direction of the second open portion H2 is formed as a dimension accommodating the lower shoulder 111, it is possible to connect the probe 112 and the upper shoulder 113 by inserting a tool into the second open portion H2, for example. Accordingly, it is possible to more easily perform work of assembling the lower shoulder 111 and the upper shoulder 113.

In particular, it is preferable that the installation position of the plate material W1 and the installation position of the welding jig 1 are positions low in the Z-axis direction which are close to the surface plate 102 as much as possible due to a problem of workability, vibration generation, or the like. Therefore, in a case where the bottom plate 2 of the welding jig 1 is in proximity to the surface plate 102, there is also a case where it is difficult to install the lower shoulder 111 in the welding jig 1 through the first open portion H1. Even in such a case, since the lower shoulder 111 can be installed in the welding jig 1 from the Y-axis direction through the second open portion H2 or assembling of the lower shoulder 111 to the upper shoulder 113 by a tool is possible, this leads to further improvement in workability.

According to the method of manufacturing the welded material W and the welding jig 1 of this embodiment, since the groove portion H, the first open portion H1, and the second open portion H2 are formed in the welding jig 1, it becomes possible to easily and reliably fix the end tab W2 and to manufacture the welded material W by performing friction stir welding by using the rotating tool 106, that is, the bobbin tool.

A preferred embodiment of the present invention has been described above. However, the present invention is not limited to the above-described embodiment. Additions, omissions, substitutions, and other changes in the configuration are possible within a scope which does not depart from the gist of the present invention. The present invention is not limited by the above description and is limited by only the scope of the appended claims.

For example, in the welding jig 1, both the first open portion H1 and the second open portion H2 need not be necessarily formed. That is, it is acceptable if the lower shoulder 111 can be installed in the welding jig 1 with only either of the open portions, the lower shoulder 111 can be operated toward the groove portion H, and a connection state between the probe 112 and the upper shoulder 113 can be visually observed.

Further, even in a case where both the first open portion H1 and the second open portion H2 are formed, if the first open portion H1 is formed, the second open portion H2 may not be necessarily formed with the dimension in the above-described embodiment, and it is acceptable if the connection situation between at least the probe 112 and the upper shoulder 113 can be visually observed.

In addition, it is possible to manufacture the welded material W while suppressing the thermal expansion of the end tab W2 by supplying air or cooling water to the end tab W2 during the execution of the friction stir welding process S7. In addition, since the thermal expansion of the end tab W2 can be suppressed by using a material having high thermal conductivity, such as copper, for example, in the welding jig 1, this leads to improvement in welding quality.

Further, the second open portion H2 may be open in the X-axis direction. That is, the second open portion H2 may be formed so as to penetrate the end portion side plate 4 of the welding jig 1. In this case, the second open portion H2 may not be necessarily open in the Y-axis direction. That is, the side plates 3 may be provided over the entire area in the X-axis direction of the bottom plate 2.

INDUSTRIAL APPLICABILITY

The present invention relates to a welded material manufacturing method which welds members with the members abutting each other, and a welding jig which is used in the method. According to the welded material manufacturing method and the welding jig related to the present invention, it is possible to easily and reliably fix the end tab and perform the friction stir welding by using the bobbin tool.

REFERENCE SIGNS LIST

1: welding jig
2: bottom plate
3: side plate
4: end portion side plate
W2a: pilot hole
H: groove portion
H1: first open portion (open portion)
H2: second open portion (open portion)
W1: plate material
W1a: abutting portion
W2: end tab
W: welded material
L: abutment line
L1: extended line
L2: center line
S1: plate material preparation process
S2: jig preparation process
S3: jig installation process
S4: end tab installation process
S5: rotating tool preparation process
S6: rotating tool installation process
S7: friction stir welding process
100: friction stir welding device
101: bed
102: surface plate
103: device main body
104: working head
105: rotation mechanism
106: rotating tool
111: lower shoulder (first shoulder)
111b: upper surface
112: probe
112a: male threaded portion
113: upper shoulder (second shoulder)
113a: female threaded portion
113b: lower surface
115: clamp
116: screw jack

The invention claimed is:

1. A welded material manufacturing method of performing friction stir welding with abutting portions of plate materials interposed between a first shoulder and a second shoulder, the method comprising:
 a process of preparing a welding jig which is disposed so as to straddle a line extended from an abutment line of the abutting portions and supports an end tab from a position intersecting with the extended line and in which a groove portion which is disposed along the extended line and through which the first shoulder can pass and an open portion facing the groove portion are formed;
 a process of disposing the plate materials so as to abut each other;
 a process of disposing the welding jig at an end portion of the abutment line;
 a process of installing the end tab on the welding jig and aligning the end tab with respect to the plate materials;
 a process of disposing the first shoulder and a probe connected to the first shoulder at a position that is on the groove portion side with respect to the extended line;
 a process of disposing the second shoulder at a position corresponding to the first shoulder and the probe;
 a process of connecting the second shoulder and the probe so as to interpose the end tab between the first shoulder and the second shoulder; and
 a process of executing the friction stir welding.

2. The welded material manufacturing method according to claim 1, wherein as the welding jig, a welding jig in which the open portion has a first open portion penetrating coaxially with the first shoulder and the probe in a direction in which the first shoulder and the second shoulder come close to each other and are separated from each other is used.

3. The welded material manufacturing method according to claim 2, wherein as the welding jig, a welding jig in which the first open portion has an outer diameter greater than an outer diameter of the first shoulder is used.

4. The welded material manufacturing method according to claim 1, wherein as the welding jig, a welding jig in which the open portion has a second open portion penetrating in a direction orthogonal to a direction in which the first shoulder is separated from the second shoulder and facing a connection portion between the first shoulder and the probe is used.

5. The welded material manufacturing method according to claim 4, wherein as the welding jig, a welding jig in which an opening dimension of the second open portion in a direction in which the first shoulder and the second shoulder come close to each other and are separated from each other has a size in which the first shoulder is accommodated in the second open portion in a state where the second shoulder is connected to the probe is used.

* * * * *